US011988031B2

(12) United States Patent
Tan et al.

(10) Patent No.: US 11,988,031 B2
(45) Date of Patent: May 21, 2024

(54) GATE MECHANISM AND CASH RECYCLING AND HANDLING DEVICE

(71) Applicant: SHANDONG NEW BEIYANG INFORMATION TECHNOLOGY CO., LTD., Shandong (CN)

(72) Inventors: Jiawu Tan, Shandong (CN); Zhenxing Zhao, Shandong (CN); Yong Yuan, Shandong (CN); Lei Zheng, Shandong (CN); Qiangzi Cong, Shandong (CN)

(73) Assignee: SHANDONG NEW BEIYANG INFORMATION TECHNOLOGY CO., LTD., Shandong (CN)

( * ) Notice: Subject to any disclaimer, the term of this patent is extended or adjusted under 35 U.S.C. 154(b) by 583 days.

(21) Appl. No.: 17/286,329

(22) PCT Filed: Sep. 27, 2019

(86) PCT No.: PCT/CN2019/108696
§ 371 (c)(1),
(2) Date: Apr. 16, 2021

(87) PCT Pub. No.: WO2020/078202
PCT Pub. Date: Apr. 23, 2020

(65) Prior Publication Data
US 2021/0381298 A1 Dec. 9, 2021

(30) Foreign Application Priority Data
Oct. 18, 2018 (CN) .......................... 201811218450.2

(51) Int. Cl.
*E05F 15/665* (2015.01)
*G06Q 10/30* (2023.01)
*G07D 11/14* (2019.01)

(52) U.S. Cl.
CPC .......... *E05F 15/665* (2015.01); *G06Q 10/30* (2013.01); *G07D 11/14* (2019.01);
(Continued)

(58) Field of Classification Search
CPC . E05F 15/665; G06Q 10/30; E05Y 2201/434; E05Y 2201/652; E05Y 2201/71;
(Continued)

(56) References Cited

U.S. PATENT DOCUMENTS 690,749 A * 1/1902 Mathews ................ B66B 13/06
49/125
3,693,293 A * 9/1972 Egan, Jr. .................. E05D 15/08
49/56

(Continued)

FOREIGN PATENT DOCUMENTS

CN    201215668 Y *  4/2009  ............. G07D 11/14
CN    103824392 A     5/2014
(Continued)

OTHER PUBLICATIONS

English Translation of CN 201215668Y (Year: 2009).*
(Continued)

*Primary Examiner* — Jeffrey A Shapiro
(74) *Attorney, Agent, or Firm* — George Likourezos; Carter, DeLuca & Farrell LLP

(57) ABSTRACT

Disclosed are a gate mechanism and a cash recycling and handling device. The gate mechanism includes a frame with an opening, a driving door and a driven door both of which are movably connected to the frame, where the driving door can be located at a first position and a second position, and the driven door can be located at a third position and a fourth position; when the driving door is located at the first position and the driven door is located at the third position, the driving door and the driven door jointly close the opening;
(Continued)

when the driving door is located at the second position and the driven door is located at the fourth position, the driving door and the driven door jointly open the opening, and the driven door at the fourth position, the driving door at the second position and a panel are sequentially stacked.

19 Claims, 6 Drawing Sheets

(52) U.S. Cl.
CPC ... *E05Y 2201/434* (2013.01); *E05Y 2201/652* (2013.01); *E05Y 2201/71* (2013.01); *E05Y 2900/608* (2013.01)

(58) Field of Classification Search
CPC ......... E05Y 2900/608; E05Y 2800/122; E05Y 2900/132; E05Y 2900/142; E05Y 2900/148; E05Y 2900/20; Y02W 90/00; G07F 19/201; G07F 1/00; G07F 1/02; G07F 1/04; E05D 15/0608; E05D 15/08; E05D 15/58; E05D 15/0604; E06B 3/5072; E06B 3/922; E06B 3/924; E06B 3/50; E04B 2/827; G07D 11/14
USPC .................... 49/125, 127, 128, 130; 194/351
See application file for complete search history.

(56) References Cited

U.S. PATENT DOCUMENTS

| | | | | |
|---|---|---|---|---|
| 3,979,861 A | * | 9/1976 | Fromme | E06B 3/94 160/144 |
| 4,883,183 A | * | 11/1989 | Kimura | G07D 11/14 235/379 |
| 6,748,998 B2 | * | 6/2004 | Yamagami | B23Q 5/34 160/117 |
| 7,752,789 B2 | * | 7/2010 | Sun | F16M 11/045 211/151 |
| 2006/0225987 A1 | | 10/2006 | Chien et al. | |

FOREIGN PATENT DOCUMENTS

| | | |
|---|---|---|
| CN | 104851185 A | 8/2015 |
| CN | 108492449 A | 9/2018 |
| CN | 207938087 U | 10/2018 |
| CN | 109285268 A | 1/2019 |

OTHER PUBLICATIONS

First Search of Chinese prior Application No. 2018112184502.
International Search Report issued by the China National Intellectual Property Administration in relation to International Application No. PCT/CN2019/108696, dated Dec. 27, 2019.
First Office Action issued by the State Intellectual Propoerty Office of People's Republic of China in relation to International Application No. 201811218450.2, Mar. 19, 2020 (English Translation).
First Office Action issued by the State Intellectual Propoerty Office of People's Republic of China in relation to International Application No. 201811218450.2, Mar. 19, 2020 (Original).

* cited by examiner

US 11,988,031 B2

GATE MECHANISM AND CASH RECYCLING AND HANDLING DEVICE

CROSS-REFERENCES TO RELATED APPLICATION

This is a national stage application, filed under 37 U.S.C. 371, of International Patent Application NO. PCT/CN2019/108696, filed on Sep. 27, 2019, which is based on and claims priority to Chinese patent application No. 201811218450.2 filed on Oct. 18, 2018 to the CNIPA, disclosure of which is incorporated herein by reference in its entirety.

TECHNICAL FIELD

The present application relates to the field of banknote treatment equipments, for example, relates to a gate mechanism and cash recycling and handling device.

BACKGROUND bill recycling terminal is a financial self-service device which combines a variety of functions, such as cash recycling, depositing, withdrawing, temporary storage, clearing, counting, counterfeit cash identification, crown word number recording, continuous and uninterrupted cash input, custody of cashes at the ends of days, query, and enables banknotes of various denominations and circulating in domestic to be recycled for use.

The bill recycling terminal generally includes a banknote input mechanism, a banknote output mechanism, a banknote accumulation and separation mechanism, a banknote identification mechanism, a plurality of banknote boxes, a recycling box, and a banknote conveying mechanism connected between the above-mentioned mechanisms, the banknote boxes, and the recycling box.

The banknote input mechanism is provided with a banknote inlet, and the banknote output mechanism is provided with a banknote outlet. The banknote inlet is used for inputting banknotes, and the banknote outlet is used for outputting banknotes. To prevent foreign matters from falling into openings such as the banknote inlet and the banknote outlet, the openings such as the banknote inlet and the banknote outlet are provided with a gate, which closes the openings such as the banknote inlet and the banknote outlet when they are not working.

In the related art, a gate mechanism includes a gate and a gate driving assembly, where the gate driving assembly drives the gate to move so as to open or close the opening. In order to ensure a large opening to meet the requirements of use, the size of the gate in the gate mechanism also needs to be designed large enough; therefore, large space is occupied when the gate opens or closes, which is not beneficial for a miniaturization design of a cash recycling and handling device.

SUMMARY

The present application provides a gate mechanism which occupies little space and is beneficial for a miniaturization design of devices.

The present application further provides a cash recycling and handling device provided with a gate mechanism which occupies little space and is beneficial for a miniaturization design of the cash recycling and handling device.

Embodiments of the present application are implemented as follows:

A gate mechanism includes a frame and a gate assembly. The frame includes a panel, two first guiding grooves and two second guiding grooves, where the panel is provided with an opening, the two first guiding grooves are located on two sides of the opening respectively, the two second guiding grooves are located on the two sides of the opening respectively and located between the two first guiding grooves, the first guiding grooves and the second guiding grooves each extend along a direction in which the gate assembly opens. The gate assembly includes a driving door and a driven door, where two ends of the driving door are slidably inserted into the two first guiding grooves respectively, two ends of the driven door are slidably inserted into the two second guiding grooves respectively, the driving door can be located at a first position and a second position, and the driven door can be located at a third position and a fourth position; when the driving door is located at the first position and the driven door is located at the third position, the driving door and the driven door are configured to jointly close the opening; when the driving door is located at the second position and the driven door is located at the fourth position, the driving door and the driven door are configured to jointly open the opening, and the driven door at the fourth position, the driving door at the second position and the panel are sequentially stacked.

A cash recycling and handling device includes a banknote inlet, a banknote outlet and the gate mechanism described above.

At least one of the banknote inlet and the banknote outlet is provided with the gate mechanism.

BRIEF DESCRIPTION OF DRAWINGS

A brief description of the figures to be used in the embodiments is given below. It should be understood that the following figures only show some embodiments of the present application, and thus should not be regarded as limitations to the protection scope. Those skilled in the art can obtain other related figures according to these figures without creative work.

REFERENCE NUMERALS

Figure 1:
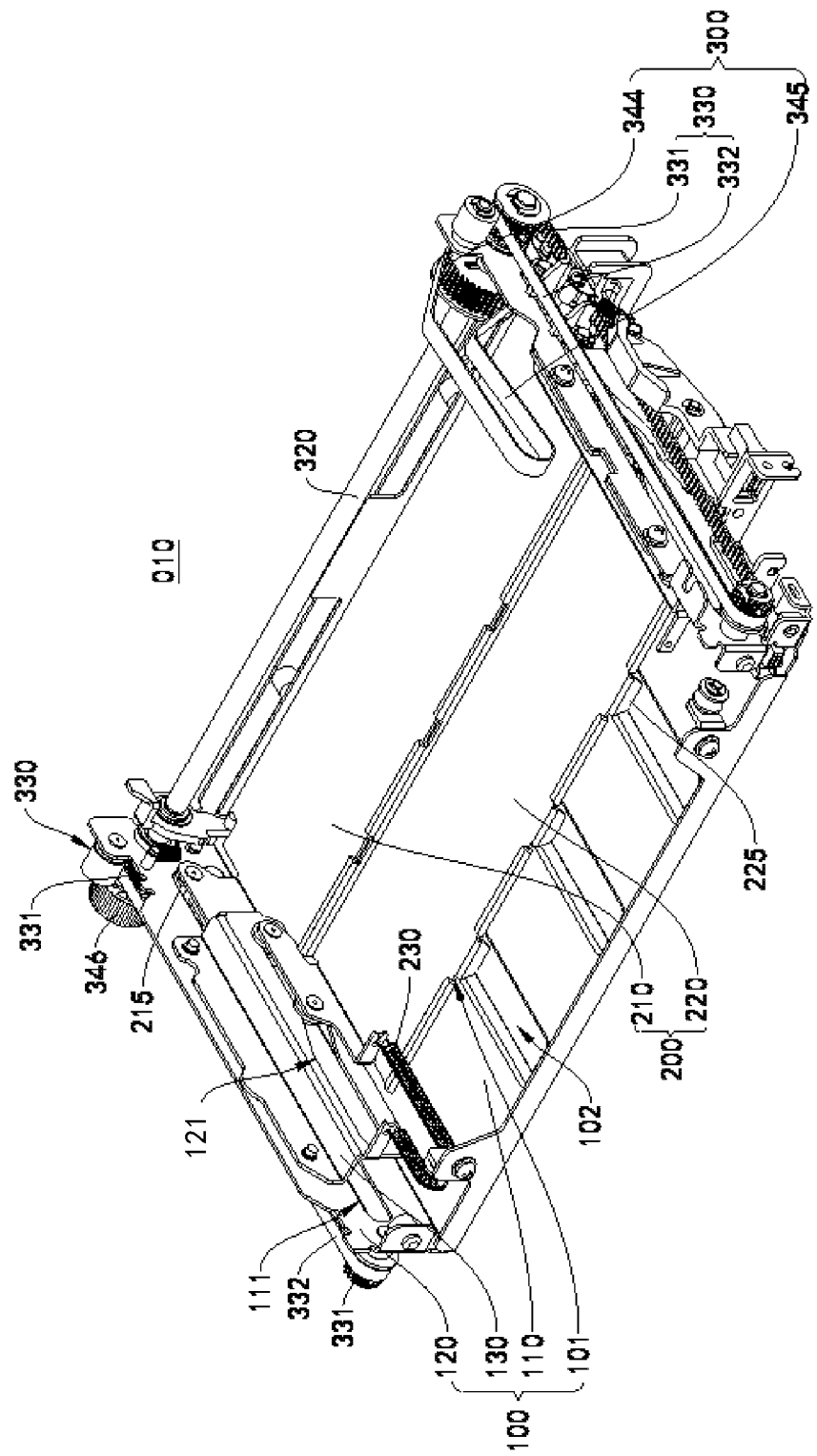
FIG. 1 is a structural diagram of a gate mechanism taken from a first view according to an embodiment of the present application.

010—gate mechanism; 100—frame; 110—panel; 120—side plate; 130—holder; 101—opening; 102—groove; 111—first guiding groove; 121—second guiding groove; 122—first section; 123—second section; 124—third section; 200—gate assembly; 210—driving door; 211—first door—opening driving portion; 212—second door—opening driving portion; 213—first door panel; 214—door—closing driving portion; 215—first roller; 216—anti—collision rubber pad; 220—driven door; 221—door—opening force receiving portion; 222—second door panel; 223—vertical plate; 224—horizontal plate; 225—limiting portion; 226—door—closing force receiving portion; 227—second roller; 230—elastic member; 020—cash recycling and handling device; 231—first supporting member; 232—second supporting member; 300—driving assembly; 310—motor; 320—transmission shaft; 330—transmission assembly; 331—first pulley; 332—first conveyor belt; 341—first bevel gear; 342—second bevel gear; 343—second pulley; 344—third pulley; 345—second conveyor belt; 346—handwheel; 347—pressing roller; 351—detecting piece; 352—position sensor; 348—connection base; 410—banknote input mechanism; 420—banknote output mechanism; 430—temporary storage mechanism; 440—banknote identification mechanism; 450—banknote box; 460—recycling box; 470—conveying mechanism.

DETAILED DESCRIPTION

Technical solutions in embodiments of the present application are described clearly and completely below in conjunction with the figures in the embodiments of the present application. Apparently, the described embodiments are a part, not all, of the embodiments of the present application. Generally, the assemblies in the embodiments of the present application which are described and illustrated in the figures can be arranged and designed in various different configurations.

Therefore, the following detailed description of the embodiments of the present application according to the figures is not intended to limit the scope of the present application, but merely represents the selected embodiments of the present application. Based on the embodiments of the present application, all the other embodiments obtained by those skilled in the art without creative work fall within the protection scope of the present application.

It should be noted that similar reference numerals and letters indicate similar items in the following figures, and therefore, once an item is defined in one figure, it does not need to be further defined and explained in subsequent figures.

In the description of the embodiments of the present application, it should be noted that orientations or positional relationships indicated by terms such as "above", "below", "left", "right", "vertical", and "horizontal" are those shown based on the figures or those in which a product according to the present disclosure is generally placed for use, which are merely intended for facilitating the description of the present application and simplifying the description rather than indicate or imply that devices or elements referred to have to have a particular orientation, or be constructed and operated in a particular orientation, and therefore should not be regarded as limitations to the present application. In addition, terms such as "first", "second", and "third" are merely used for distinguishing descriptions, and cannot be construed as indicating or implying relative importance. In the description of the embodiments of the present application, it should be further noted that, unless explicitly specified and defined otherwise, the terms "disposing" and "connection" should be construed in a broad sense, for example, may be a fixed connection, a detachable connection, or an integral connection, may be a mechanical connection or an electrical connection, may be a direct connection or an indirect connection through an intermediate medium, and may be a connection between interiors of two elements. For those skilled in the art, the specific meanings of the above terms in the present application can be understood according to specific cases.

Figure 2:
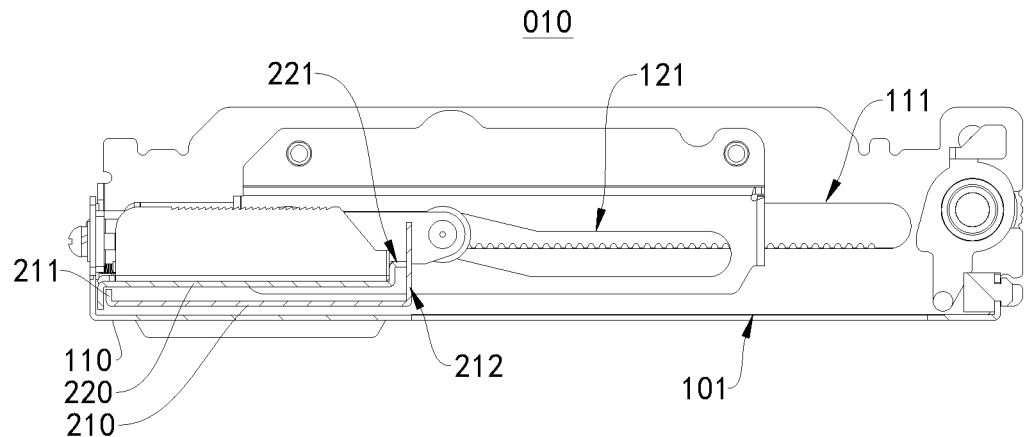
FIG. 2 is a sectional view in which a gate assembly opens an opening according to an embodiment of the present application.

FIG. 1 is a structural diagram of a gate mechanism 010 taken from a first view according to an embodiment of the present application. FIG. 2 is a sectional view in which a gate assembly 200 opens an opening 101 according to an embodiment of the present application. Referring to FIG. 1 and FIG. 2, this embodiment provides the gate mechanism 010, including a frame 100 and a gate assembly 200; where the frame 100 includes a panel 110, two first guiding grooves 111 and two second guiding grooves 121, where the panel 110 is provided with the opening 101, the two first guiding grooves 111 are located on two sides of the opening 101 respectively, the two second guiding grooves 121 are located on the two sides of the opening 101 respectively and located between the two first guiding grooves 111, and the two first guiding grooves 111 and the two second guiding grooves 121 each extend along a direction in which the gate assembly 200 opens; the gate assembly 200 includes a driving door 210 and a driven door 220, where two ends of the driving door 210 are slidably inserted into the two first guiding grooves 111 respectively, two ends of the driven door 220 are slidably inserted into the two second guiding grooves 121 respectively, the driving door 210 has a first position and a second position, and the driven door 220 has a third position and a fourth position; when the driving door 210 is located at the first position and the driven door 220 is located at the third position, the driving door 210 and the driven door 220 are configured to jointly close the opening 101; when the driving door 210 is located at the second position and the driven door 220 is located at the fourth position, the driving door 210 and the driven door 220 are configured to jointly open the opening 101, and the driven door 220 at the fourth position, the driving door 210 at the second position and the panel 110 are sequentially stacked. It should be noted that in this embodiment, the two sides of the opening 101 are perpendicular to the direction in which the gate assembly 200 opens. Since the first guiding grooves 111 and the second guiding grooves 121 in this embodiment extend along the direction in which the gate assembly 200 opens, the driving door 210 and the driven door 220 are movable in the same direction; when the opening 101 of the panel 110 is opened, the driven door 220 at the fourth position and the driving door 210 at the second position are stacked on a side of the panel 110. In this way, when the opening 101 of the panel 110 is opened, the gate mechanism 010 occupies little space, so that the gate mechanism 010 is beneficial for a miniaturization design of devices.

The frame 100 in this embodiment may further include two side plates 120 and two holders 130, where the two side plates 120 are disposed on two sides of the opening 101 of the panel 110 respectively, the two holders 130 are disposed on the two sides of the opening 101 of the panel 110 respectively, the two holders 130 are spaced from the two side plates 120 respectively, the two holders 130 are located between the two side plates 120, each of the side plates 120 is provided with a first guiding groove 111, and each of the holders 130 is provided with one second guiding groove 121.

The gate mechanism 010 in this embodiment further includes a driving assembly 300, where the driving assembly 300 is in transmission connection with the driving door 210 and configured to drive the driving door 210 to move to the first position or the second position along the first guiding grooves 111, where the driving door 210 is configured to drive the driven door 220 to move along the second guiding grooves 121 to the third position when moving to the first position; and the driving door 210 is configured to drive the driven door 220 to move along the second guiding grooves 121 to the fourth position when moving to the second position.

Figure 3:
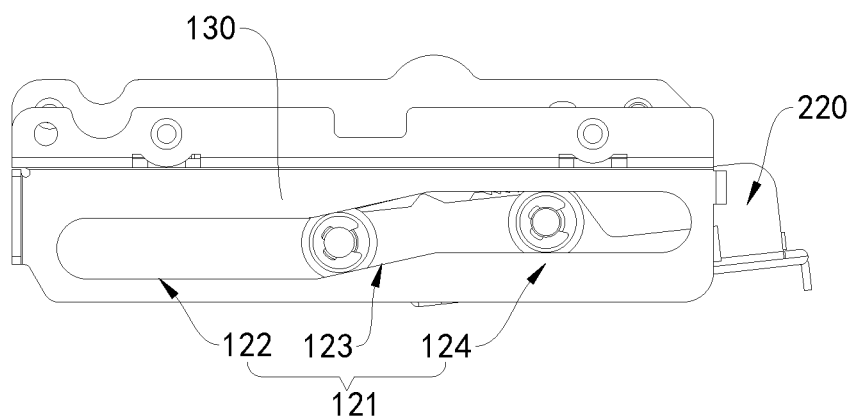
FIG. 3 is a structural diagram of a holder and a driven door taken from a first view according to an embodiment of the present application.
Figure 6:
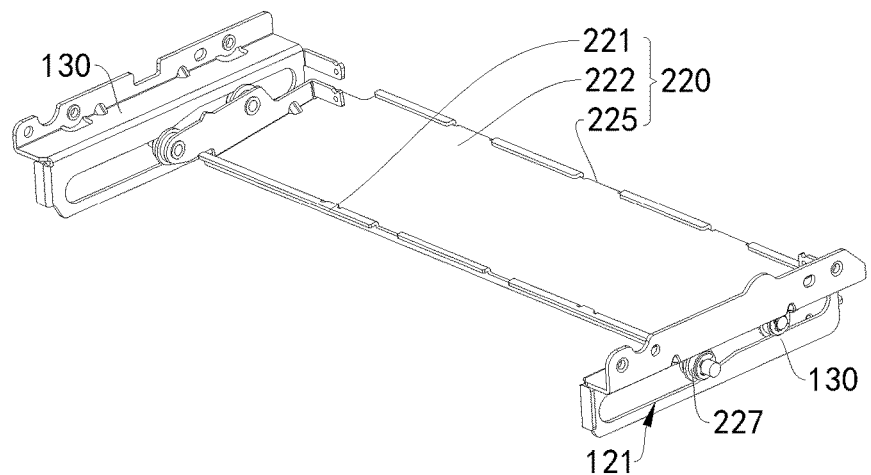
FIG. 6 is a structural diagram of a holder and a driven door taken from a second view according to an embodiment of the present application.

FIG. 3 is a structural diagram of a holder 130 and a driven door 220 according to an embodiment of the present application. FIG. 6 is a structural diagram of a holder and a driven door taken from a second view according to an embodiment of the present application. Referring to FIG. 3 and FIG. 6, each of the two second guiding grooves 121 in this embodiment includes a first section 122, a second section 123 and a third section 124, where the first section 122, the second section 123 and the third section 124 are sequentially arranged along the direction in which the gate assembly 200 opens and are arranged in a step shape. In some embodiments, in a direction perpendicular to the panel 110, the panel 110, the first section 122 and the third section 124 are spaced apart sequentially and in parallel. In some embodiments, the second section 123 is slantwise connected between the first section 122 and the third section 124, and the second section 123 may be inclined from the first section 122 to the third section 124 along a direction away from the panel 110. In detail, when the driven door 220 moves from the third position to the fourth position and passes through the second section 123, the driven door 220 is configured to move a preset distance in the direction away from the panel 110, so that when the driven door 220 moves along the third section 124, the driving door 210 is able to move in a space between the driven door 220 and the panel 110, and it is ensured that the driving door 210 at the second position and the driven door 220 at the fourth position are stacked on one side of the panel 110.

Figure 4:
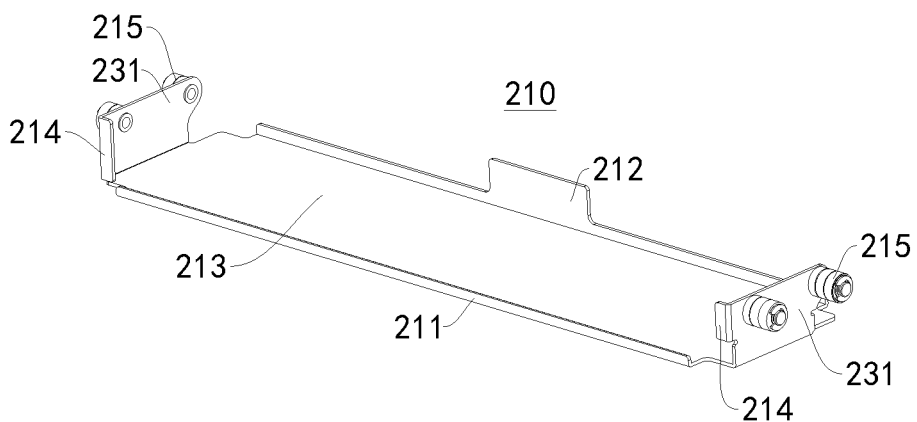
FIG. 4 is a structural diagram of a driving door according to an embodiment of the present application.

FIG. 4 is a structural diagram of a driving door according to an embodiment of the present application. Referring to FIG. 4, the driving door 210 in this embodiment includes a first door-opening driving portion 211, a second door-opening driving portion 212 and a first door panel 213, where along the direction in which the gate assembly 200 opens, the first door-opening driving portion 211 and the second door-opening driving portion 212 are disposed on a downstream end and an upstream end of the first door panel 213 respectively, and the first door-opening driving portion 211 and the second door-opening driving portion 212 each extend along a direction away from the panel 110. When the driving door 210 drives the driven door 220 to move to the fourth position, the first door-opening driving portion 211 is configured to drive the driven door 220 to move along the first section 122, and the second door-opening driving portion 212 is configured to drive the driven door 220 to move along the third section 124. In detail, during the process when the driving assembly 300 drives the driving door 210 to move from the first position to the second position, the first door-opening driving portion 211 of the driving door 210 cooperates with the driven door 220, so as to drive the driven door 220 to move along the first section 122 in a direction from the third position to the fourth position until the driven door 220 moves to the second section 123; when the driven door 220 arrives at the second section 123, the driven door 220 moves along the second section 123 in a direction towards the third section 124 until the driven door 220 moves the preset distance along the direction perpendicular to the panel 110 such that the driven door 220 is separated from the first door-opening driving portion 211; when the driving door 210 continues moving to the second position, the driving door 210 stretches into the space between the panel 110 and the driven door 220, and the second door-opening driving portion 212 of the driving door 210 can cooperate with the driven door 220, such that the driving door 210 moving to the second position drives the driven door 220 to move to the fourth position along the third section 124.

Figure 5:
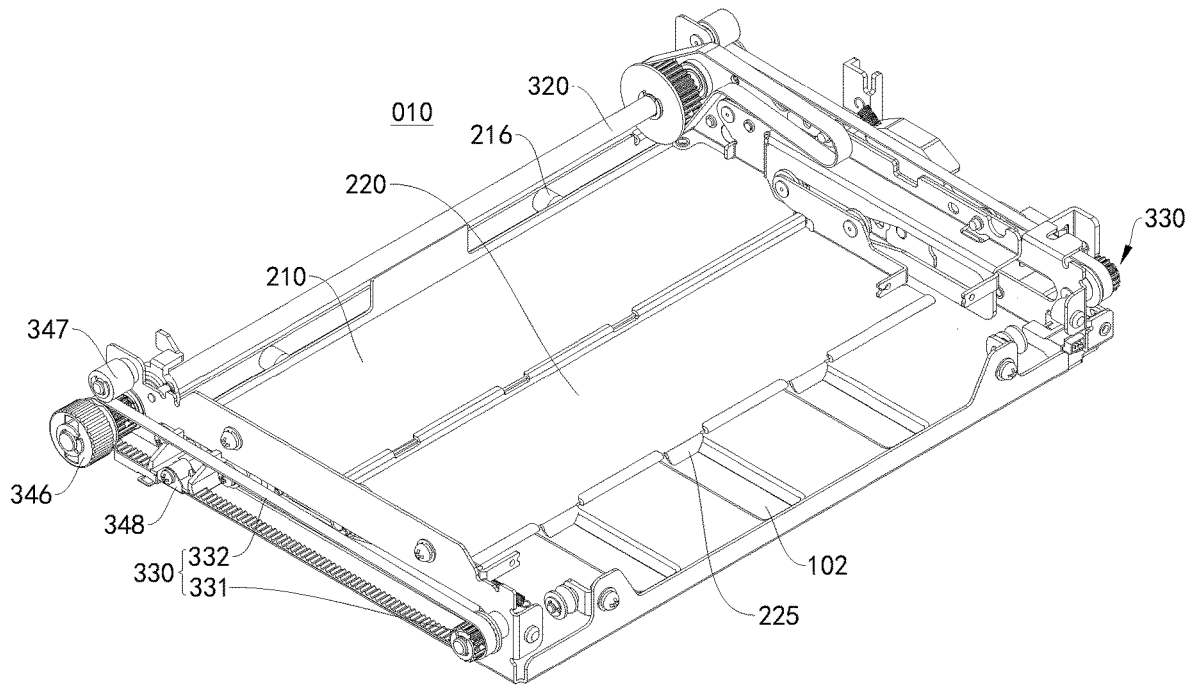
FIG. 5 is a structural diagram of a gate mechanism taken from a second view according to an embodiment of the present application.

FIG. 5 is a structural diagram of a gate mechanism 010 taken from a second view according to an embodiment of the present application. Optionally, referring to FIG. 5, the driving door 210 in this embodiment further includes an anti-collision rubber pad 216, where the anti-collision rubber pad 216 is disposed on an end of the first door panel 213 away from the first door-opening driving portion 211. When the driving door 210 arrives at the first position, the anti-collision rubber pad 216 can mitigate collisions between driving door 210 and the frame 100, to prevent damages caused by the collisions.

Figure 7:
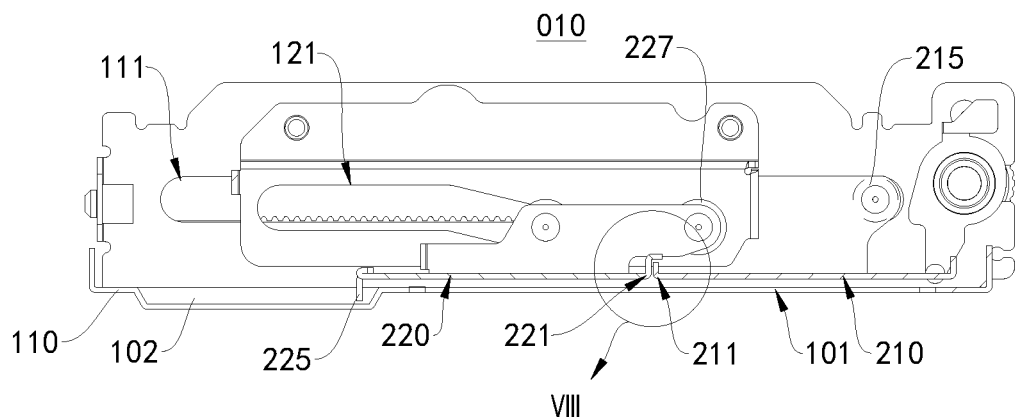
FIG. 7 is a sectional view in which a gate assembly closes an opening according to an embodiment of the present application.
Figure 8:
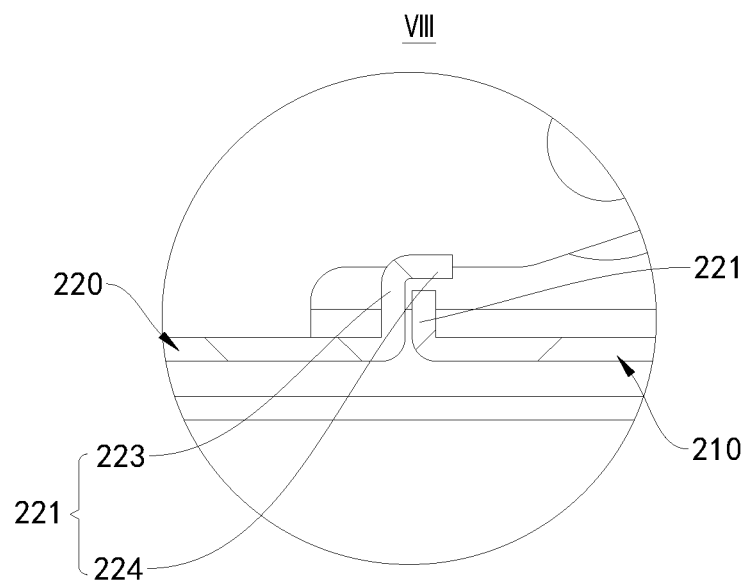
FIG. 8 is an enlarged view of part VIII in FIG. 7.

FIG. 6 is a structural diagram of a holder 130 and a driven door 220 taken from a second view according to an embodiment of the present application. FIG. 7 is a sectional view in which a gate assembly 220 closes an opening 101 according to an embodiment of the present application. FIG. 8 is an enlarged view of part VIII in FIG. 7. Referring to FIG. 6 to FIG. 8, the driven door 220 in this embodiment includes a door-opening force receiving portion 221 and a second door panel 222, where along the direction in which the gate assembly 200 opens, the door-opening force receiving portion 221 is disposed on an upstream end of the second door panel 222. When the driven door 220 moves along the first section 122, the door-opening force receiving portion 221 cooperates with the first door-opening driving portion 211; when the driven door 220 moves along the third section 124, the door-opening force receiving portion 221 cooperates with the second door-opening driving portion 212. In this embodiment, when the first door-opening driving portion 211 cooperates with the door-opening force receiving portion 221, the driving door 210 which is moving can be used for pushing the driven door 220 to move along the first section 122; when the second door-opening driving portion 212 cooperates with the door-opening force receiving portion 221, the driving door 210 which is moving can be used for pushing the driven door 220 to move along the third section 124.

In some embodiments, referring to FIG. 7 and FIG. 8, the door-opening force receiving portion 221 is L-shaped and includes a vertical plate 223 and a horizontal plate 224 which are connected to each other, where the vertical plate 223 is connected to the second door panel 222 and extends along the direction away from the panel 110. When the door-opening force receiving portion 221 cooperates with the first door-opening driving portion 211, the vertical plate 223 abuts against the first door-opening driving portion 211, and the horizontal plate 224 is disposed on a side of the first door-opening driving portion 221 away from the panel 110. Optionally, the first door-opening driving portion 211 is vertically connected to the first door panel 213, and the vertical plate 223 is vertically connected to second door panel 222. When the driving door 210 moves to the second position and drives the driven door 220 to move along the first section 122, the first door-opening driving portion 211 is located below the horizontal plate 224, and the first door-opening driving portion 211 is in contact with the vertical plate 223 in a face-to-face way, so that the first door-opening driving portion 211 can cooperate with the door-opening force receiving portion 221 more stably.

It should be noted that in this embodiment, a first end of the first door-opening driving portion 211 and a first end of the second door-opening driving portion 212 are respectively connected to the first door panel 213, a second end of the first door-opening driving portion 211 and a second end of the second door-opening driving portion 212 extend along the direction away from the panel 110, and an extension length of the first door-opening driving portion 211 is less than a distance between the first section 122 and the third section 124, so that when the driven door 220 moves from the first section 122 to the third section 124, the driving door 210 can insert into the space between the driven door 220 and the panel 110, and interference to the driving door 210 and the driven door 220 from the panel 110 can be prevented when the driving door 210 moves to the second position and the driven door 220 moves to the fourth position.

Optionally, in this embodiment, along the direction perpendicular to the panel 110, the height of the second door-opening driving portion 212 is greater than the height of the first door-opening driving portion 211, and along the direction perpendicular to the panel 110, the position of the third section 124 is higher than the position of the first section 122, and the height of the second door-opening driving portion 212 is greater than the height of the first door-opening driving portion 211, which is beneficial for the effective cooperation between the second door-opening driving portion 212 and the door-opening force receiving portion 221, so that the driving door 210 can smoothly push the driven door 220 to move along the third section 124. It should be noted that, referring to FIG. 4, along the direction perpendicular to the panel 110, the height of the second door-opening driving portion 212 is greater than the height of the first door-opening driving portion 211, so that the second door-opening driving portion 212 can be used for hiding a gap between the driving door 210 and the driven door 220, to prevent foreign matters from being embedded in the gap between the driving door 210 and the driven door 220 and to avoid barriers against subsequent movements of the driving door 210 and the driven door 220 when the opening 101 is opened.

Figure 9:
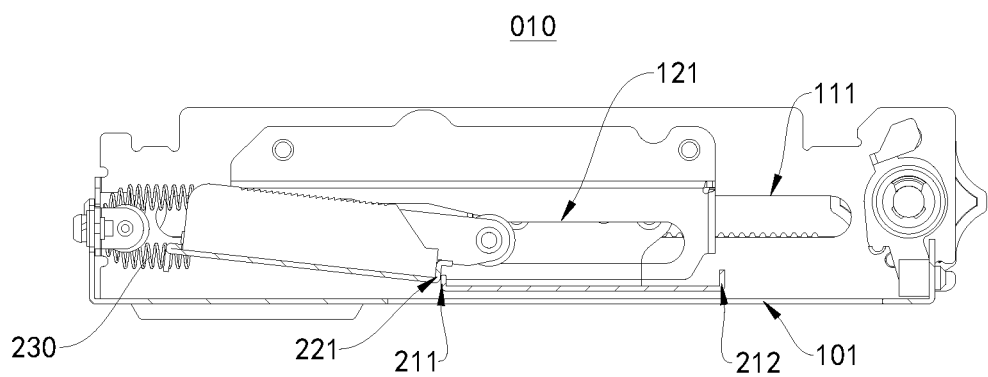
FIG. 9 is a schematic diagram of an intermediate state in which a driving door moves from a first position to a second position according to an embodiment of the present application.

FIG. 9 is a schematic diagram in which a driving door 210 is in an intermediate state when moving from a first position to a second position according to an embodiment of the present application. Referring to FIG. 1 and FIG. 9, the driving assembly 300 in this embodiment further includes an elastic member 230, where the elastic member 230 is connected between the driven door 220 and the frame 100 and the elastic member 230 is configured to drive the driven door 220 to always have a movement trend from the third position to the fourth position. In this embodiment, when the driven door 220 is driven by the driving door 210 to move to the fourth position and switches from the first section 122 to the second section 123, the movement track of the driven door 220 offsets to the direction perpendicular to the panel 110 with respect to the driving door 210, and the driving force offered by the driving door 210 to the driven door 220 decreases or disappears; at this time, the driven door 220 continues moving to the fourth position along the second section 123 under the elastic action of the elastic member 230, and the door-opening force receiving portion 221 of the driven door 220 can keep away from the first door-opening driving portion 211 so that the driving door 210 can continue moving to the second position without a barrier from the driven door 220. It should be noted that the elasticity of the elastic member 230 disposed between the driven door 220 and the frame 100 cannot be too large, so as to avoid an excessive load on the driving assembly 300 when the driving assembly 300 drives the driving door 210 to move to the first position, and the elasticity of the elastic member 230 may only enable the driven door 220 to overcome its own gravity to generate a slight displacement towards the direction away from the panel 110, thereby keeping away from the driving door 210 which moves along the direction in which the gate assembly 200 opens.

The elastic member 230 in this embodiment is a tension spring. Optionally, in other embodiments, the elastic member 230 may also be an elastic rubber strip, a torsion spring, a leaf spring, etc.

Referring to FIG. 1 and FIG. 5, the driven door 220 in this embodiment further includes a limiting portion 225, where the first end of the limiting portion 225 is disposed on an upstream end of the driven door 220, and the second end of the limiting portion 225 extends towards the panel 110; the panel 110 is provided with a groove 102 protruding outwardly (where "outwardly" refers to a direction away from the driving door 210 and the driven door 220), where the length of the groove 102 extends along the direction in which the gate assembly 200 opens, and the second end of the limiting portion 225 is slidably inserted into the groove 102. In detail, when the driven door 220 moves between the third position and the fourth position, the limiting portion 225 is inserted into the groove 102 and moves back and forth, so that the driven door 220 can move stably along the direction in which the gate assembly 200 opens, and the driven door 220 can be prevented from sliding away from the frame 100, and in addition, the foreign matters are prevented from entering the gap between the driven door 220 and the panel 110.

Figure 10:
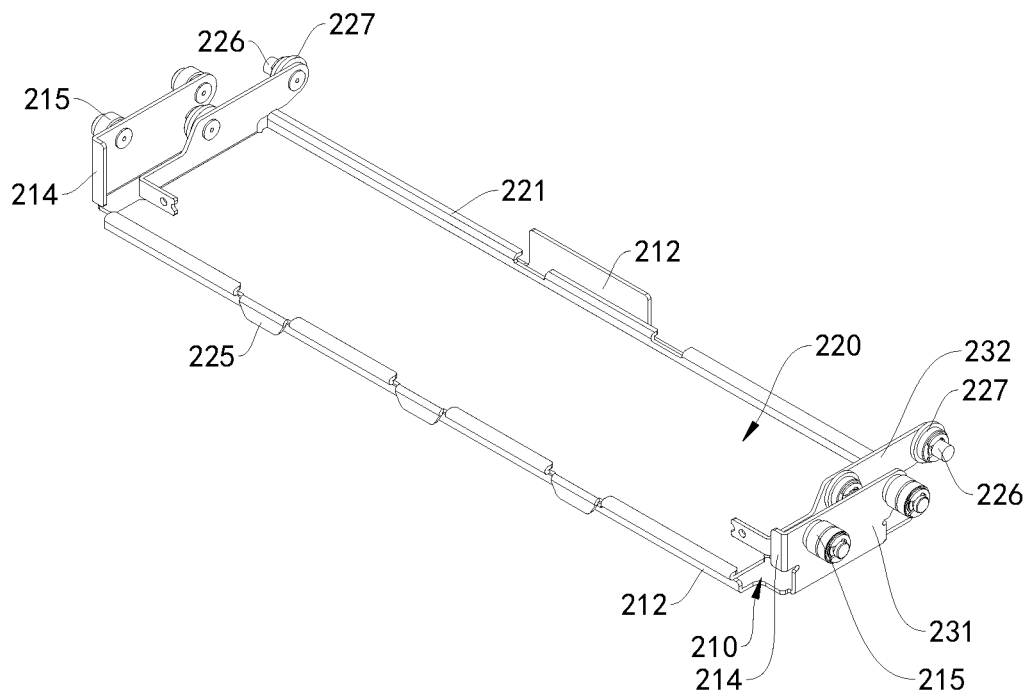
FIG. 10 is a structural diagram of a driving door is stacked with a driven door according to an embodiment of the present application.

FIG. 10 is a structural diagram in which a driving door 210 is stacked with a driven door 220 according to an embodiment of the present application. Referring to FIG. 10, each of the two ends of the driving door 210 is provided with a first supporting member 231, each of the two ends of the driven door 220 is provided with a second supporting member 232, and the first supporting member 231 and the second supporting member 232 on one side of the opening 101 are spaced apart; the driving door 210 in this embodiment further includes a door-closing driving portion 214, where a first end of the door-closing driving portion 214 is connected to the first supporting member 231, and a second end of the door-closing driving portion 214 extends along a direction towards the second supporting member 232; the driven door 220 further includes a door-closing force receiving portion 226, where a first end of the door-closing force receiving portion 226 is connected to the second supporting member 232, and a second end of the door-closing force receiving portion 226 extends along a direction towards the first supporting member 231. When the driving door 210 moves towards the first position, the door-closing driving portion 214 cooperates with the door-closing force receiving portion 226 to drive the driven door 220 to move towards the third position. Optionally, along the direction in which the gate assembly 200 opens, the door-closing driving portion 214 is disposed on a downstream end of the driving door 210, and the door-closing force receiving portion 226 is disposed on the upstream end of the driven door 220, such that when the driving assembly 300 drives the driving door 210 to move in the direction towards the first position, the driving door 210 first moves a certain distance to make the driving door 210 stacked with the driven door 220 extend out of the driven door 220, and then the door-closing driving portion 214 of the driving door 210 can be in contact with the door-closing force receiving portion 226 of the driven door 220 and the driving door 210 drives the driven door 220 to move towards the third position as the driving door 210 continues moving. When the driving door 210 moves to the first position, and the driven door 220 moves to the third position, the driving door 210 and the driven door 220 are configured to jointly close the opening 101 of the panel 110.

In some embodiments, on the two sides of the opening 101, each of the two ends of the driving door 210 is provided with the door-closing driving portion 214, each of the two ends of the driven door 220 is provided with the door-closing force receiving portion 226, and the door-closing driving portions 214 and the door-closing force receiving portions 226 cooperate with each other in a one-to-one correspondence.

In some embodiments, referring to FIG. 10, the first supporting member 231 is provided with a first roller 215, and the second supporting member 232 is provided with a second roller 227, where the first roller 215 is inserted into the corresponding one of the two first guiding grooves 111, and the second roller 227 is inserted into the corresponding one of the two second guiding grooves 121. In detail, when the driving door 210 and the driven door 220 move along the direction in which the gate assembly 200 opens, the first roller 215 and the second roller 227 are slidable in the first guiding groove 111 and the second guiding groove 121 respectively, so that the driving door 210 and the driven door 220 can move more smoothly.

Optionally, the door-closing force receiving portion 226 is disposed on a shaft of the second roller 227, or is directly formed by the shaft of the second roller 227, so that a door-closing driving structure can be simpler.

Figure 11:
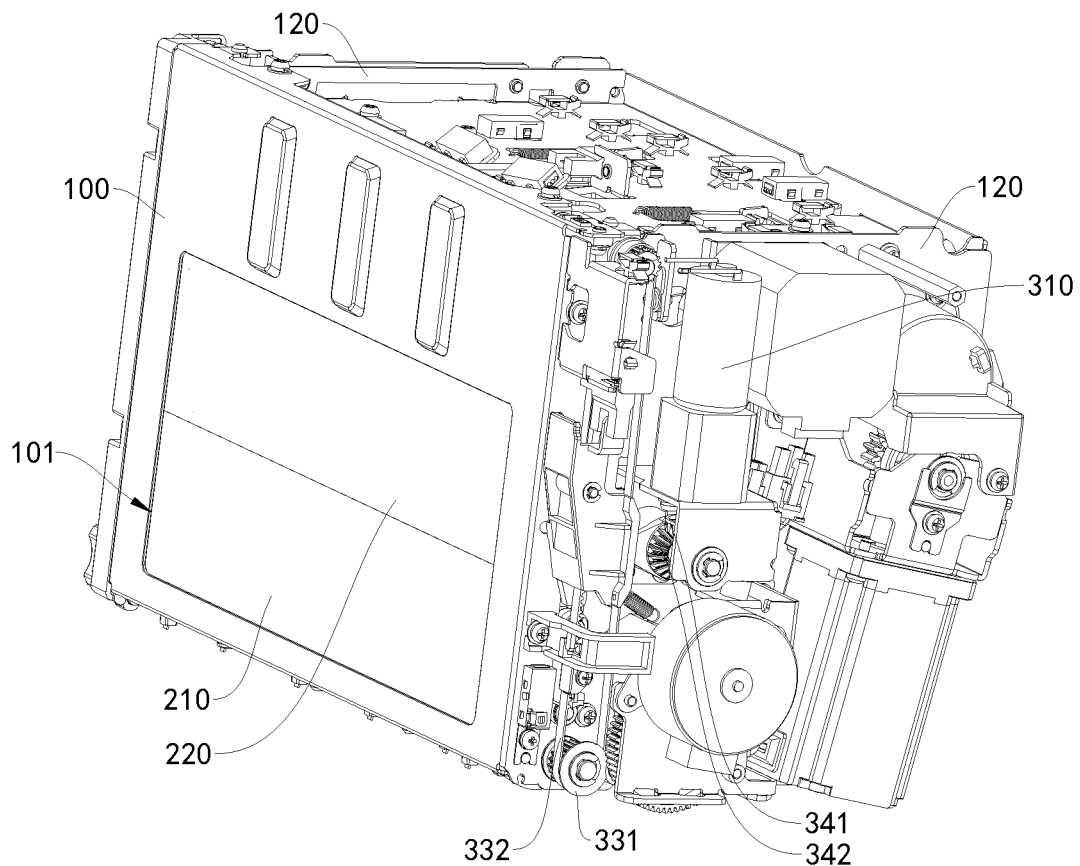
FIG. 11 is a partial structural diagram of a cash recycling and handling device according to an embodiment of the present application.
Figure 12:
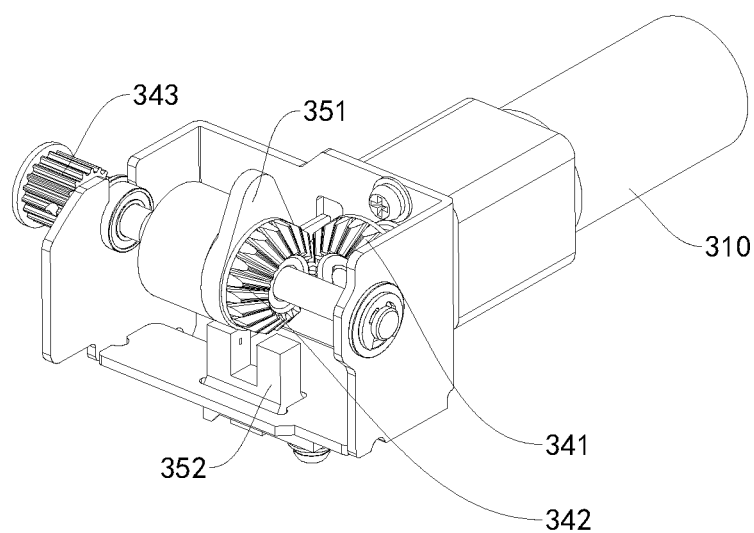
FIG. 12 is a partial structural diagram of a driving assembly of a gate mechanism according to an embodiment of the present application.

Referring to FIG. 1 and FIG. 11, the driving assembly 300 in this embodiment includes a motor 310, a transmission shaft 320 and two transmission assemblies 330, where two transmission assemblies 330 are disposed on two sides of the frame 100 respectively, two transmission assemblies 330 are in transmission connection with the transmission shaft 320 to synchronize operations of the two transmission assemblies 330, and the output shaft of the motor 310 is in transmission connection with one of the transmission assemblies 300. In detail, referring to FIG. 1 and FIG. 5, each of the transmission assemblies 330 includes two first pulleys 331 which are spaced apart along the direction in which the gate assembly 200 opens and a first conveyor belt 332 sleeved on the two first pulleys 331, where one first pulley 331 of one transmission assemblies 330 is in transmission connection with the output shaft of the motor 310, two ends of the transmission shaft 320 are connected to the two first pulleys 331 on two sides of the transmission shaft 320 respectively, the two ends of the driving door 210 are fixedly connected to first conveyor belts 332 located on two sides of the driving door 210 respectively. When the output shaft of the motor 310 rotates, the first pulley 331 is driven to rotate, and the first pulley 331 which rotates drives the first conveyor belt 332 to move, so that the driving door 210 is driven to move along the direction in which the gate assembly 200 opens or along a direction in which the gate assembly 200 closes. Referring to FIG. 1 and FIG. 12, the driving assembly 300 in this embodiment further includes a first bevel gear 341, a second bevel gear 342, a second pulley 343, a third pulley 344 and a second conveyor belt 345, where the first bevel gear 341 is in transmission connection with the output shaft of the motor 310, the first bevel gear 341 engages with the second bevel gear 342, the second pulley 343 in transmission connection with the motor 310 is coaxially disposed with the second bevel gear 342, the third pulley 344 is spaced from the second pulley 343, the second conveyor belt 345 is sleeved on and supported by the second pulley 343 and the third pulley 344, and the third pulley 344 is sleeved on the transmission shaft 320. When the output shaft of the motor 310 rotates, the first bevel gear 341, the second bevel gear 342 and the second pulley 343 are driven to rotate together, the second conveyor belt 345 is driven by the second pulley 343 to move, so as to drive the third pulley 344 and the first pulley 331 to rotate, to enable the first pulley 331 to be in transmission connection with the motor 310. Optionally, the first bevel gear 341 is in transmission connection with the output shaft of the motor 310 through a reduction gearbox.

Referring to FIG. 12, the driving assembly 300 in this embodiment further includes a detecting piece 351 and a position sensor 352, where the position sensor 352 is disposed on the frame 100, the detecting piece 351 is coaxially disposed with the second bevel gear 342 and configured to cooperate with the position sensor 352 when rotating. When the detecting piece 351 cooperates with the position sensor 352, the driving door 210 is located at the first position, and the driven door 220 is located at the third position. The position sensor 352 may be a light sensor or an electromagnetic sensor or a mechanical sensor. Optionally, in other embodiments, the first pulley 331 may be sleeved on the output shaft of the motor 310 to be in transmission connection with the motor 310.

In some embodiments, referring to FIG. 5, the transmission assembly 330 further includes a connection base 348, where the connection base 348 is fixedly disposed on the first conveyor belt 332 and fixedly connected to the driving door 210. Optionally, the driving assembly 300 further includes a handwheel 346 and a pressing roller, where the handwheel 346 is coaxially disposed with one of the first pulleys 331. When the motor 310 is in trouble, the handwheel 346 can be manually driven to rotate to drive the first pulley 331 to rotate to drive the first conveyor belt 332 to operate, and drive the driving door 210 to move along the direction in which the gate assembly 200 opens. The pressing roller 347 is spaced from the first pulley 331, and the first conveyor belt 332 is disposed between the pressing roller 347 and the first pulley 331, so that the pressing roller 347 is used for ensuring that the first conveyor belt 332 is always kept in a tight state so as to stably engage with the first pulley 331. Therefore, when the first pulley 331 rotates, the first conveyor belt 332 can move more stably along with the first pulley 331.

Figure 13:
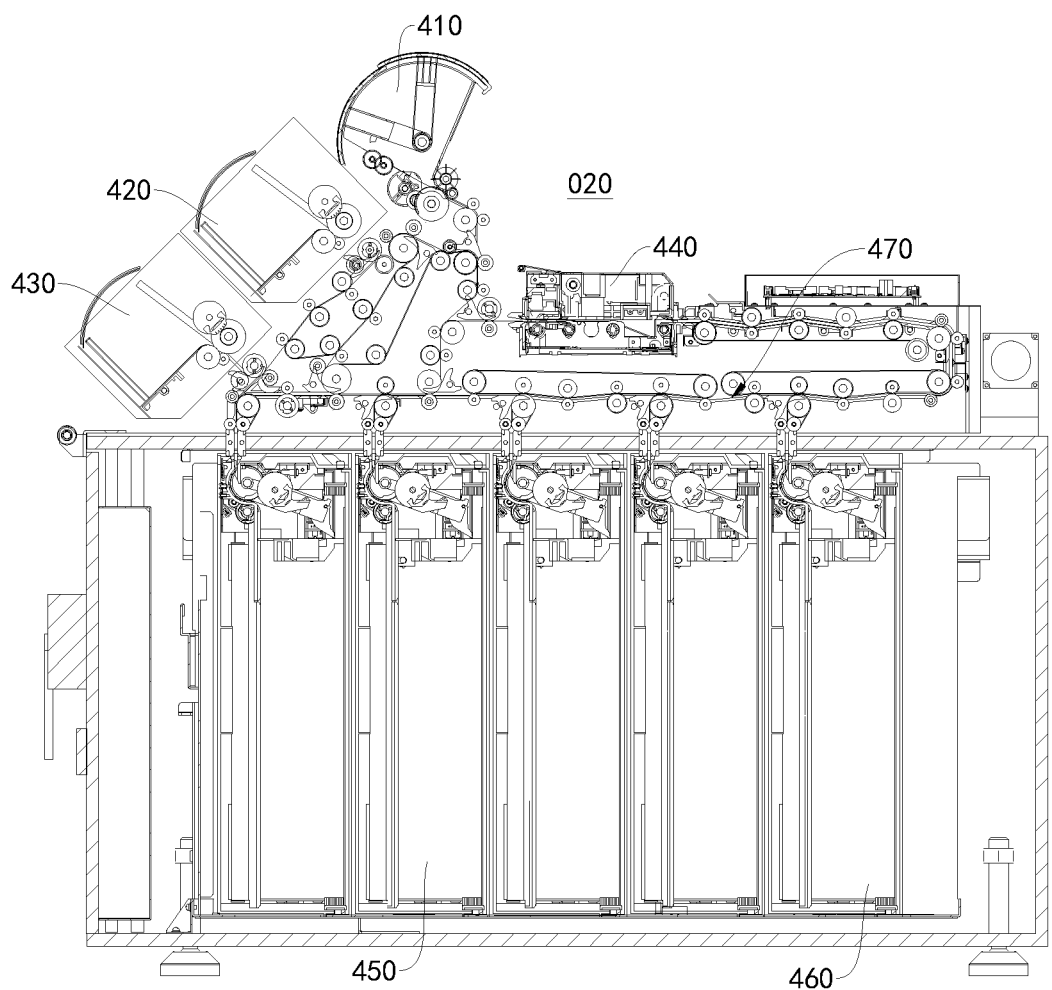
FIG. 13 is a structure sectional view of a cash recycling and handling device according to an embodiment of the present application.

FIG. 13 is a sectional view showing a structure of a cash recycling and handling device 020 according to an embodiment of the present application. Referring to FIG. 13, this embodiment further provides the cash recycling and handling device 020, and the cash recycling and handling device 020 further includes a banknote input mechanism 410, a banknote output mechanism 420, a temporary storage mechanism 430, a banknote identification mechanism 440, a plurality of banknote boxes 450, a recycling box 460, and a banknote conveying mechanism 470 connected between the devices, the banknote boxes 450, and the recycling box 460. The banknote boxes 450 are configured to store and distribute banknotes; the recycling box 460 is configured to store banknotes which are no longer circulated, the banknote input mechanism 410 is provided with a banknote inlet, and the banknote output mechanism 420 is provided with a banknote outlet, where the banknote inlet is used for inputting banknotes, and the banknote outlet is used for outputting banknotes. Openings 101 such as the banknote inlet and the banknote outlet may be provided with the gate mechanism 010 described above. When the gate mechanism 010 opens, users may deposit or withdraw banknotes, and structures and working principles of the gate mechanism 010 are the same as those described in the preceding embodiments and are not repeated here.

The gate mechanism 010 provided in this embodiment may be disposed in the cash recycling and handling device 020, and is configured to open or close the banknote inlet of the banknote input mechanism 410 or the banknote outlet of the banknote output mechanism 420. Moreover, when the opening 101 of the gate mechanism 010 in this embodiment is opened, the driving door 210 and the driven door 220 are stacked on one side of the panel 110, which can effectively reduce space occupied by the gate mechanism 010 and is beneficial for a miniaturization design of the cash recycling and handling device 020 provided with the gate mechanism 010.

The beneficial effects of the gate mechanism in the present application are described below.

The driving assembly of the gate mechanism provided by the embodiments of the present application can drive the driving door to move along the first guiding grooves to the first position or the second position, and during the process when the driving door moves, the driving door drives the driven door to move along the second guiding grooves to the third position or the fourth position, where the first guiding grooves and the second guiding grooves extend along the direction in which the gate assembly 200 opens, so that the driving door and the driven door can move along the same direction. When the driving door is located at the second position and the driven door is located at the fourth position, the driving door and the driven door are configured to jointly open the opening of the panel, and the driving door at the second position and the driven door at the fourth position are stacked on the back of the panel. In this way, when the opening of the panel is opened, the driving door and the driven door are stacked above the panel, the gate mechanism occupies little space, so that the whole gate mechanism occupies little space and is beneficial for a miniaturization design of devices provided with the gate mechanism.

The cash recycling and handling device provided by the embodiments of the present application is provided with the gate mechanism described above, where the gate mechanism occupies little space when the gate mechanism opens the opening of the panel, which is beneficial for a miniaturization design of the cash recycling and handling device.

What is claimed is:

1. A gate mechanism, comprising: a frame and a gate assembly;
   wherein the frame comprises a panel, two first guiding grooves and two second guiding grooves, wherein the panel is provided with an opening, the two first guiding grooves are located on two sides of the opening respectively, the two second guiding grooves are located on the two sides of the opening respectively and located between the two first guiding grooves, and the two first guiding grooves and the two second guiding grooves each extend along a direction in which the gate assembly opens; and
   wherein the gate assembly comprises a driving door and a driven door, wherein two ends of the driving door are slidably inserted into the two first guiding grooves respectively, two ends of the driven door are slidably inserted into the two second guiding grooves respectively, the driving door is capable of being located at a first position and a second position, and the driven door is capable of being located at a third position and a fourth position; when the driving door is located at the first position and the driven door is located at the third position, the driving door and the driven door are configured to jointly close the opening; when the driving door is located at the second position and the driven door is located at the fourth position, the driving door and the driven door are configured to jointly open the opening, and the driven door at the fourth position, the driving door at the second position and the panel are sequentially stacked;
   wherein each of the two ends of the driving door is provided with a first supporting member, each of the two ends of the driven door is provided with a second supporting member, and the driving door comprises a door-closing driving portion, wherein a first end of the door-closing driving portion is connected to the first supporting member, and a second end of the door-closing driving portion extends along a direction towards the second supporting member; the driven door comprises a door-closing force receiving portion, wherein a first end of the door-closing force receiving portion is connected to the second supporting member, and a second end of the door-closing force receiving portion extends along a direction towards the first supporting member; when the driving door moves towards the first position, the door-closing driving portion cooperates with the door-closing force receiving portion to drive the driven door to move towards the third position.

2. The gate mechanism as claimed in claim 1, further comprising a driving assembly, wherein the driving assembly is in transmission connection with the driving door and configured to drive the driving door to move along the two first guiding grooves to the first position or the second position, wherein the driving door is configured to drive the driven door to move along the two second guiding grooves to the third position when moving to the first position, and the driving door is configured to drive the driven door to move along the two second guiding grooves to the fourth position when moving to the second position.

3. The gate mechanism as claimed in claim 2, wherein each of the two second guiding grooves comprises a first section, a second section and a third section, wherein the first section, the second section and the third section are sequentially arranged along the direction in which the gate assembly opens and are arranged in a step shape; and wherein in a direction perpendicular to the panel, the panel, the first section and the third section are spaced apart sequentially.

4. The gate mechanism as claimed in claim 3, wherein the first section and the third section are spaced apart in parallel, and the second section is slantwise connected between the first section and the third section.

5. The gate mechanism as claimed in claim 3, wherein the driving door comprises a first door-opening driving portion, a second door-opening driving portion and a first door panel, wherein along the direction in which the gate assembly opens, the first door-opening driving portion and the second door-opening driving portion are disposed on a downstream end and an upstream end of the first door panel respectively, the first door-opening driving portion and the second door-opening driving portion each extend along a direction away from the panel, the first door-opening driving portion is configured to drive the driven door to move along the first section when the driving door drives the driven door to move to the fourth position, and the second door-opening driving portion is configured to drive the driven door to move along the third section when the driving door drives the driven door to move to the fourth position.

6. The gate mechanism as claimed in claim 5, wherein along the direction perpendicular to the panel, a height of the second door-opening driving portion is greater than a height of the first door-opening driving portion.

7. The gate mechanism as claimed in claim 3, further comprising an elastic member, wherein the elastic member is connected between the driven door and the frame, and the elastic member is configured to drive the driven door to move along the second section when the driving door drives the driven door to move to the fourth position.

8. The gate mechanism as claimed in claim 5, wherein the driven door comprises a second door panel and a door-opening force receiving portion, wherein along the direction in which the gate assembly opens, the door-opening force receiving portion is disposed on an upstream end of the second door panel, and the door-opening force receiving portion is configured to cooperate with the first door-opening driving portion when the driven door moves along the first section, and the door-opening force receiving portion is configured to cooperate with the second door-opening driving portion when the driven door moves along the third section.

9. The gate mechanism as claimed in claim 8, wherein the door-opening force receiving portion is L-shaped and comprises a vertical plate and a horizontal plate which are connected to each other, wherein the vertical plate is connected to the second door panel and extends along the direction away from the panel, and the vertical plate is configured to abut against the first door-opening driving portion when the door-opening force receiving portion cooperates with the first door-opening driving portion; the horizontal plate is disposed on a side of the first door-opening driving portion away from the panel.

10. The gate mechanism as claimed in claim 1, wherein the first supporting member is provided with a first roller, wherein the first roller is inserted into a corresponding one of the two first guiding grooves; the second supporting member is provided with a second roller, wherein the second roller is inserted into a corresponding one of the two second guiding grooves.

11. The gate mechanism as claimed in claim 1, wherein the panel is provided with a groove protruding outwardly, wherein a length of the groove extends along the direction in which the gate assembly opens; along the direction in which the gate assembly opens, a limiting portion is disposed on an upstream end of the driven door and slidably inserted into the groove.

12. A cash recycling and handling device, comprising: a banknote inlet, a banknote outlet, and the gate mechanism as claimed in claim 1;
wherein at least one of the banknote inlet and the banknote outlet is provided with the gate mechanism.

13. The cash recycling and handling device as claimed in claim 12, wherein the gate mechanism further comprises a driving assembly, wherein the driving assembly is in transmission connection with the driving door and configured to drive the driving door to move along the two first guiding grooves to the first position or the second position, wherein the driving door is configured to drive the driven door to move along the two second guiding grooves to the third position when moving to the first position, and the driving door is configured to drive the driven door to move along the two second guiding grooves to the fourth position when moving to the second position.

14. The cash recycling and handling device as claimed in claim 13, wherein each of the two second guiding grooves comprises a first section, a second section and a third section, wherein the first section, the second section and the third section are sequentially arranged along the direction in which the gate assembly opens and are arranged in a step shape; and
wherein in a direction perpendicular to the panel, the panel, the first section and the third section are spaced apart sequentially.

15. The cash recycling and handling device as claimed in claim 14, wherein the first section and the third section are spaced apart in parallel, and the second section is slantwise connected between the first section and the third section.

16. The cash recycling and handling device as claimed in claim 14, wherein the driving door comprises a first door-opening driving portion, a second door-opening driving portion and a first door panel, wherein along the direction in which the gate assembly opens, the first door-opening driving portion and the second door-opening driving portion are disposed on a downstream end and an upstream end of the first door panel respectively, the first door-opening driving portion and the second door-opening driving portion each extend along a direction away from the panel, the first door-opening driving portion is configured to drive the driven door to move along the first section when the driving door drives the driven door to move to the fourth position, and the second door-opening driving portion is configured to drive the driven door to move along the third section when the driving door drives the driven door to move to the fourth position.

17. The cash recycling and handling device as claimed in claim 16, wherein along the direction perpendicular to the panel, a height of the second door-opening driving portion is greater than a height of the first door-opening driving portion.

18. The cash recycling and handling device as claimed in claim 14, the gate mechanism further comprises an elastic member, wherein the elastic member is connected between the driven door and the frame, and the elastic member is configured to drive the driven door to move along the second section when the driving door drives the driven door to move to the fourth position.

19. The cash recycling and handling device as claimed in claim 16, wherein the driven door comprises a second door panel and a door-opening force receiving portion, wherein along the direction in which the gate assembly opens, the door-opening force receiving portion is disposed on an upstream end of the second door panel, and the door-opening force receiving portion is configured to cooperate with the first door-opening driving portion when the driven door moves along the first section, and the door-opening force receiving portion is configured to cooperate with the second door-opening driving portion when the driven door moves along the third section.

* * * * *